US012659838B2

(12) United States Patent
Henry et al.

(10) Patent No.: US 12,659,838 B2
(45) Date of Patent: Jun. 16, 2026

(54) SYSTEMS AND METHODS FOR ADAPTIVE PROBE RESPONSE

(71) Applicant: Cisco Technology, Inc., San Jose, CA (US)

(72) Inventors: Jerome Henry, Pittsboro, NC (US); Stephen M Orr, Wallkill, NY (US)

(73) Assignee: Cisco Technology, Inc., San Jose, CA (US)

( * ) Notice: Subject to any disclaimer, the term of this patent is extended or adjusted under 35 U.S.C. 154(b) by 555 days.

(21) Appl. No.: 18/164,927

(22) Filed: Feb. 6, 2023

(65) Prior Publication Data

US 2024/0267830 A1      Aug. 8, 2024

(51) Int. Cl.
  H04L 12/26 (2006.01)
  H04W 24/08 (2009.01)
  H04W 48/08 (2009.01)
  H04W 48/16 (2009.01)
  *H04W 88/10* (2009.01)

(52) U.S. Cl.
  CPC ........... H04W 48/08 (2013.01); H04W 24/08 (2013.01); H04W 48/16 (2013.01); *H04W 88/10* (2013.01)

(58) Field of Classification Search
  CPC ..... H04W 48/08; H04W 48/16; H04W 88/10; H04W 48/10; H04W 88/08; H04W 84/12; H04L 45/28; H04L 45/22; H04L 29/14; H04L 45/00
  See application file for complete search history.

(56) References Cited

U.S. PATENT DOCUMENTS

| | | | | |
|---|---|---|---|---|
| 9,369,538 B2 * | 6/2016 | Faccin | .................... | H04L 67/59 |
| 9,775,181 B2 * | 9/2017 | Ahuja | ................... | H04W 76/18 |
| 2005/0030924 A1 * | 2/2005 | Yano | ................... | H04W 36/302 |
| | | | | 370/332 |
| 2005/0059353 A1 | 3/2005 | Smith et al. | | |
| 2012/0155350 A1 | 6/2012 | Wentink et al. | | |
| 2013/0107738 A1 * | 5/2013 | Cherian | ................ | H04W 76/11 |
| | | | | 370/252 |

(Continued)

OTHER PUBLICATIONS

Cisco: "Cisco Catalyst 9800 Series Wireless Controller Software Configuration Guide, Cisco IOS XE Cupertino 17.8. x", Apr. 11, 2022, pp. 1-8, XP093167190, Retrieved from https://www.cisco.com/c/en/US/td/docs/wireless/controller/9800/17-8/config-guide/b_wl_17_8_cg/m_vewlc_802_11w.html, p. 2-p. 4, figure 2.

(Continued)

*Primary Examiner* — Phuongchau Ba Nguyen
(74) *Attorney, Agent, or Firm* — Merchant & Gould P.C.

(57) ABSTRACT

Systems and methods for providing adaptive probe responses may be provided. An Access Point (AP) may receive a new probe response configuration, and compare the new probe response configuration to an old probe response configuration. The AP may determine that AP is operating in an ignore, a duplicate, or a hybrid mode based on the comparison of the new probe response configuration to the old probe response configuration. The AP may determine one or more probe response structures using the new probe response configuration and/or the old probe response configuration based on the mode the AP is operating in. When the AP receives a probe request from a Station (STA), the AP may send one or more probe responses in the probe response structures based the mode the AP is operating in.

20 Claims, 5 Drawing Sheets

(56) References Cited

U.S. PATENT DOCUMENTS

| | | | |
|---|---|---|---|
| 2015/0282157 A1* | 10/2015 | Kim ..................... | H04W 72/21 |
| | | | 370/329 |
| 2017/0019785 A1 | 1/2017 | Liu et al. | |
| 2017/0185474 A1 | 6/2017 | Thoukydides et al. | |
| 2017/0273012 A1 | 9/2017 | Zhang et al. | |
| 2021/0345240 A1* | 11/2021 | Del Sordo ........ | H04W 52/0258 |
| 2021/0400537 A1* | 12/2021 | Zhang .................... | H04L 47/28 |
| 2022/0303879 A1 | 9/2022 | Khoury et al. | |
| 2024/0267830 A1* | 8/2024 | Henry .................. | H04W 48/16 |

OTHER PUBLICATIONS

International Search Report and Written Opinion for International Application No. PCT/US2024/014608, mailed Oct. 7, 2024, 21 Pages.

Vanhoef M., et al., "Dragonblood: Analyzing the Dragonfly Handshake of WPA3 and EAP-pwd", IACR, INternational Association for Cryptologic Research, vol. 20190416:032828, Apr. 10, 2019, XP061032063, 17 Pages, Retrieved from http://eprint.iacr.org/2019/383.pdf on Apr. 10, 2019, paragraph [02.2].

* cited by examiner

200

205

START

Receive A New Probe Response Configuration — 210

Compare The New Probe Response Configuration To An Old Probe Response Configuration — 220

Determine The AP Is Operating In An Ignore Mode — 230

Determine A Probe Response Structure Based On The AP Operating In The Ignore Mode — 240

Receive A Probe Request — 250

Send A Probe Response In The Probe Response Structure — 260

END — 270

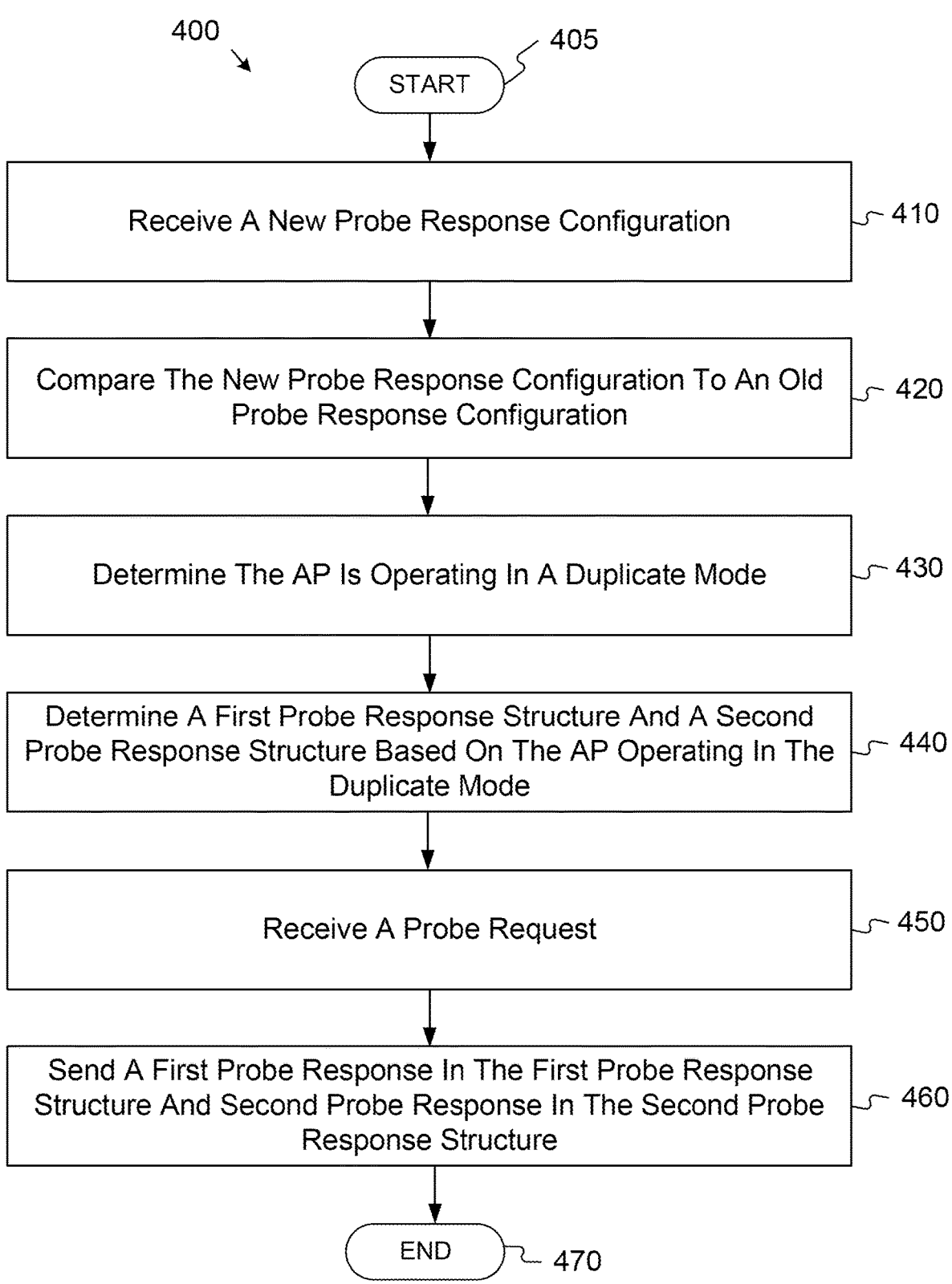

400

405
START

Receive A New Probe Response Configuration — 410

Compare The New Probe Response Configuration To An Old Probe Response Configuration — 420

Determine The AP Is Operating In A Duplicate Mode — 430

Determine A First Probe Response Structure And A Second Probe Response Structure Based On The AP Operating In The Duplicate Mode — 440

Receive A Probe Request — 450

Send A First Probe Response In The First Probe Response Structure And Second Probe Response In The Second Probe Response Structure — 460

END — 470

FIG. 4

SYSTEMS AND METHODS FOR ADAPTIVE PROBE RESPONSE

TECHNICAL FIELD

The present disclosure relates generally to providing systems and methods for providing adaptive probe responses.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 4 is a flow chart of a method for providing adaptive probe responses with an AP in a duplicate mode.

DETAILED DESCRIPTION

Overview

Figure 1:
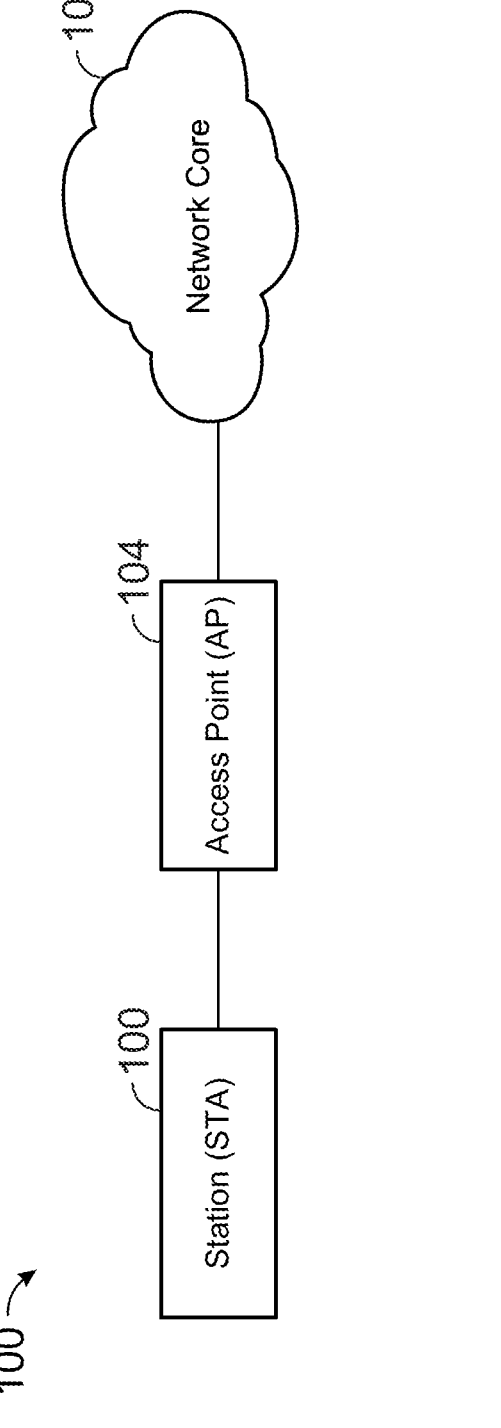
FIG. 1 is a block diagram of an operating environment for providing adaptive probe responses.

Systems and methods for providing adaptive probe responses may be provided. An Access Point (AP) may receive a new probe response configuration, and compare the new probe response configuration to an old probe response configuration. The AP may determine that AP is operating in an ignore, a duplicate, or a hybrid mode based on the comparison of the new probe response configuration to the old probe response configuration. The AP may determine one or more probe response structures using the new probe response configuration and/or the old probe response configuration based on the mode the AP is operating in. When the AP receives a probe request from a Station (STA), the AP may send one or more probe responses in the probe response structures based the mode the AP is operating in.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

With the Wi-Fi Protected Access (WPA)-3 Personal Transition Mode, an Access Point (AP) may advertise in the Robust Security Network Information Element (RSNIE) an Authentication and Key Management (AKM) suite count of two (e.g., two AKMs on a single Service Set Identifier (SSID)). The two AKMs may be a WPA2-Pre Shared Key (PSK) and a WPA3-Simultaneous Authentication of Equals (SAE). When operating correctly, WPA3 clients should choose the WPA3-SAE AKM, and the WPA2-only clients should choose WPA2-PSK AKM when associating with a device of the network. However, poorly developed WPA2 clients may receive the RSNIE with 2 AKMs, conclude that the AP probe response is corrupted and fail to process multiple AKM advertisements or fail to handle new AKMs that the clients do not understand (e.g., because the clients receive an AKM that is unknown such as WAP3-SAE), and fail to associate even though the clients could use the WPA2-PSK AKM method. Each time new functionalities affecting core elements of the network are added, older clients that implement a strict bit match can fail to associate. This failure to associate may be an ongoing problem as new functionalities are inserted in Information Elements (IE). Clients may address the failure to associate by ignoring the IEs that are not recognized, even though the clients may be able to associate if the correct AKM is used. Thus, clients may continue to fail to associate absent systems and/or methods to address the problems with association that arise when multiple AKMs are offered on a single SSID, including in the particular case of WPA3.

FIG. 1 is a block diagram of an operating environment 100 for providing adaptive probe responses. The operating environment 100 includes a Station (STA) 102, an Access Point (AP) 104, and a network core 106. The STA 102 may be a device (e.g., a laptop, a desktop personal computer, a smart phone, a server, etc.) that is capable of communicating with the AP 104 or otherwise access the network core 106. The AP 104 may be a device that can facilitate a connection between the STA 102 and the network core 106. The network core 106 may be a device that can provide services to devices that communicate and otherwise connect to the network core 106.

The AP 104 may broadcast a beacon to notify devices (e.g., the STA 102) that the AP 104 may be able to initiate an association or otherwise be connected to. To initiate the connection or association between the STA 102 and the AP 104, the STA 102 may send a probe request to the AP 104. The AP 104 may then send a probe response to the STA 102, and the STA 102 and the AP 104 may proceed with the rest of association process (e.g., authentication request, authentication response, association request, association response, etc.) according to the probe response and the probe request.

However, as described above, STAs may be limited to out of date or otherwise alternative network options and/or features. For example, the STA 102 may have been produced before features were created and/or introduced, and the STA 102 may therefore not be capable of using features that have been created and/or introduced since the STA's production. Therefore, the AP 104 may address limitations of the STA 102 in the probe response sent to the STA 102 to attempt to allow the STA 102 to successfully associate with the AP 104.

The probe response the AP 104 sends to the STA 102 may include an Information Element (IE), and the IE may include inclusive and/or exclusive options. An exclusive option is an option of the IE that will be set or not set. For example, bit 54 of the Extended Capabilities field may be set to one when Stream Classification Service (SCS) is supported and be set to zero when SCS is not supported. Therefore, bit 54 of the Extended Capabilities field may be an exclusive option. The STA 102 may expect the bit to be set to zero or one for exclusive options, and association with the AP 104 may fail when the bit is not set as the STA 102 expects.

An inclusive option is an option of the IE that can include one or more values. For example, the RSNIE field may contain a list of zero or more AKMs supported by the AP 104. Therefore, the RSNIE field may be an inclusive option. The STA 102 may expect a particular value or set of values for inclusive options, and association with the AP 104 may fail when the field is not set as the STA 102 expects.

New exclusive options and/or new inclusive options may be added to probe responses as network standards (e.g., the Institute of Electrical and Electronics Engineers (IEEE) 802.11 standard) and/or networking organization certifications evolve. Additionally, field structures may change as features are added, removed, and/or altered (e.g., the Extended Capabilities field has grown from 39 bits to 82 bits). New fields may also be added to account for changes.

The STA 102 may send an association failure report to the AP 104 when the STA 102 fails to associate with the AP 104. Additionally, the AP 104 may monitor the change of a ratio between probe requests received, such as from the STA 102, and subsequent successful associations. Therefore, the AP 104 may track individual association attempts and a total ratio of successful associations. Randomizing and Changing Media Access Control (RCM) may cause the scanning Media Access Control (MAC) to be different from the MAC address used for association. However, the association choreography may be common to both RCM and no RCM cases with most clients: the STA 102 may start by sending probe requests on successive channels and then attempt to join one Basic SSID (BSSID), possibly using a different MAC than during the scanning phase. The AP 104 may detect the inability to connect by either the failure of the association attempt (e.g., logged on a Wireless LAN Controller (WLC) or reported by the user device) or by determining that the scanning phase is not followed by an authentication request. In a stable network, the ratio of scans to connection requests may be stable over time, as the ratio may be a function of the average client population spread. Configuration changes causing clients to fail to associate (e.g., adding and/or removing options to an IE in a probe response) may change this ratio.

The AP 104 may have one or more Wireless Local Area Networks (WLANs). For each configured WLAN on the AP 104, the AP 104 may store an associated probe response structure. The AP 104 may also store a ratio of scans-to-successful associations for each WLAN. The probe responses for the WLANs may include soft parameter fields (e.g., timestamp, Basic Service Set (BSS) Load, etc.) that are expected to be variable from one response to the next. The AP 104 may wildcard the variable soft parameter fields. When the AP 104 configures a new WLAN and/or when the AP 104 changes an existing WLAN configuration, the AP 104 may compare the structure of the new probe response to the existing probe response to identify changes (e.g., changes to bits and/or fields in the IE).

The AP 104 may operate in an ignore mode, a hybrid mode, and/or a duplicate mode. The AP 104 may receive instructions (e.g., from a system of the network, from a user configuring the network) to determine which mode to operate in. For example, a user configuring the network may operate a user interface to evaluate expected differences between the probe responses in different modes to determine which mode the AP 104 should operate in.

In the ignore mode, the AP 104 may set the new probe responses with all new bits and/or fields used irrespective of the differences with the probe responses of previously configured WLANs. For example, the probe responses may include every update (e.g., updates to the IE according to network standards, network certifications, etc.) so old options included in probe responses of previous WLAN configurations are replaced with the new options. Thus, the AP 104 may not make changes to the probe responses to assist older STAs when associating. The AP 104 may monitor the association failures and/or changes to the scans-to-successful associations ratios while in ignore mode.

In the hybrid mode, the AP 104 may send two probe responses for the same BSSID: (1) a probe response with the older options, and (2) a probe response with the old and the new options. Therefore, the first probe response may be a probe response that is structured based on a previously configured WLAN, and the second probe response may include the options of the previously configured WLAN and the new options corresponding to the new configuration. The hybrid mode may be adapted for inclusive changes (e.g., new elements are added or removed within a given IE). This mode may be used for changes such as changes introduced with WPA3, where now the AP 104 may announce an RSNIE with the single WPA2-PSK AKM, then another announcement with both a WPA2-PSK AKM and a WPA3-SAE AKM for example.

In the duplicate mode, the AP 104 may send two probe responses for the same BSSID: (1) a probe response with the older options, and (2), a probe response with the new options. Therefore, the first probe response may be a probe response that is structured based on a previously configured WLAN, and the second probe response may include the new options corresponding to the new configuration. This mode may be adapted for exclusive changes (e.g., bits are set or unset in an IE, the IE size changed, and/or new IEs are added). The duplicate mode may be used when changes related to new features support are added (e.g. IEEE 802.11r with new AKMs replacing older AKMs in the RSNIE and new IEs added such as Fast Transition Element (FTE)).

In the hybrid mode and/or the duplicate mode, the AP 104 may create test sequences to assess the effectiveness of one or more of the probe response structures. For example, on a random set of channels, only one response type may be sent, and the scans-to-successful associations ratio for these channels may be compared to the scans-to-successful associations ratio of other channels where both responses (e.g., a probe response with the older options and a probe response with the new options and older options in the hybrid mode, a probe response with the older options and a probe response with the new options in the duplicate mode). These elements may be displayed in a user interface so a user (e.g., a network administrator) can decide when to converge to a single probe response. The elements may include new options that are causing failures, the increase in failures associated with the options, and/or the like. The AP 104 and/or the user interacting with the user interface may decide if changes to the probe response structure should be made. For example, a new option that causes a three percent higher occurrence of association failures but is considered more beneficial than the increased association failure occurrence may be included in the probe response. In another example, a new option may cause an eighteen percent higher occurrence of association failures and not be considered more beneficial than the higher occurrence of association failures. The change may not be included in the probe response structure in this example. Additionally, the AP 104 and/or the user may evaluate whether the devices that have the increased association failures are critical or not. For example, the affected devices may be outdated devices that perform inessential operations, so the higher association failure rate may be determined to be irrelevant to determining to include the new option.

The AP 104 may address association failures with reactive remediation (e.g., in response to changes in the authentication success ration and/or in response to detected failed associated attempts) and/or proactive remediation (e.g., address association failures before determining that specific failures occur and/or that a ratio of successful associations changes). The AP 104 may operate in a reactive mode, a proactive mode, or a mixed mode with reactive and proactive operations. In a reactive mode, the AP 104 may compare the scans-to-successful associations ratio of a newly configured WLAN to the scans-to-successful associations ratios of one or more previously configured WLANs. In a proactive mode, the AP 104 may progressively introduce new options to the configuration of a WLAN. For example, the AP 104 may monitor the WLAN for changes in the scans-to-successful associations ratio and/or for association failure reports as features are incrementally added.

While the AP 104 monitors the scans-to-successful associations ratios and/or the association failure reports, the AP 104 may determine to alter the operation of the AP 104 based on a change in the scans-to-successful associations ratio and/or the failure reports passing a threshold and/or frequency. For example, if the AP 104 is operating in an ignore mode and the scans-to-successful associations ratio changes to indicate a higher level of association failures compared to other probe response structures, the AP 104 may change operation to the hybrid mode and/or the duplicate mode. Additionally, the AP 104 may make changes to the probe response structure(s) used while operating in the present mode. For example, the AP 104 may be operating in the ignore mode and iteratively add the new options to probe responses while monitoring the scans-to-successful associations ratios and/or the association failure reports to determine if a new option will cause association failures.

Figure 2:
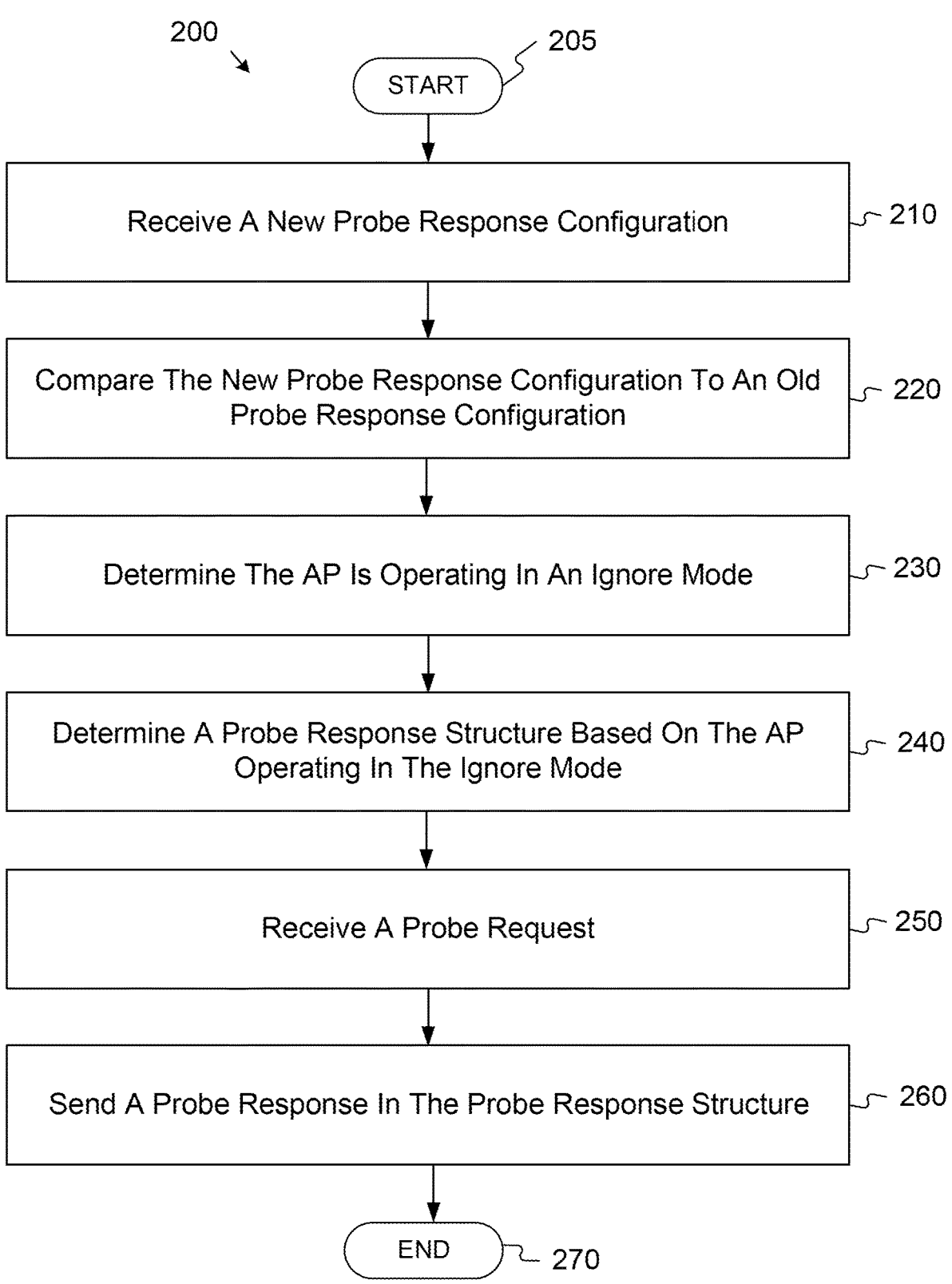
FIG. 2 is a flow chart of a method for providing adaptive probe responses with an Access Point (AP) in an ignore mode.

FIG. 2 is a flow chart of a method 200 for providing adaptive probe responses with an AP in an ignore mode. The method 200 may begin in starting block 205 and proceed to operation 210. In operation 210, a new probe response configuration may be received. For example, the AP 104 may receive a new probe response configuration in response to new options being available (e.g., changes to standards or certifications).

In operation 220, the new probe response configuration may be compared to an old probe response configuration. The comparing may include determining one or more Information Element (IE) changes. For example, the AP 104 may compare the new IE and the old IE to determine changes (e.g., changes to bits, additions to fields, deletions from fields, etc.). The AP 104 may compare the new probe response configuration to the old probe response configuration to determine the new options included in the new probe response configuration.

In operation 230, it may be determined that the AP is operating in an ignore mode. For example, the AP 104 determines the AP 104 is or should be operating in the ignore mode based on the comparison of the new probe response configuration to the old probe response configuration. For example, the AP 104 may determine the new changes only effect inessential devices, the new changes are not expected to cause an unwanted increase in association failures, and/or the like.

In operation 240, a probe response structure using the new probe response configuration may be determined based on determining the AP is operating in the ignore mode. For example, the AP 104 determines to include all new options in the probe response structure because the AP 104 is operating in the ignore mode In operation 250, a probe request from a STA may be received. For example, the AP 104 receives the probe request from the STA 102. In operation 260, a probe response in the probe response structure may be sent. For example, in response to the probe request, the AP 104 sends the probe response in the probe response structure that includes all of the new options based on determining the AP 104 is operating in the ignore mode. The method 200 may conclude at ending block 270.

Figure 3:
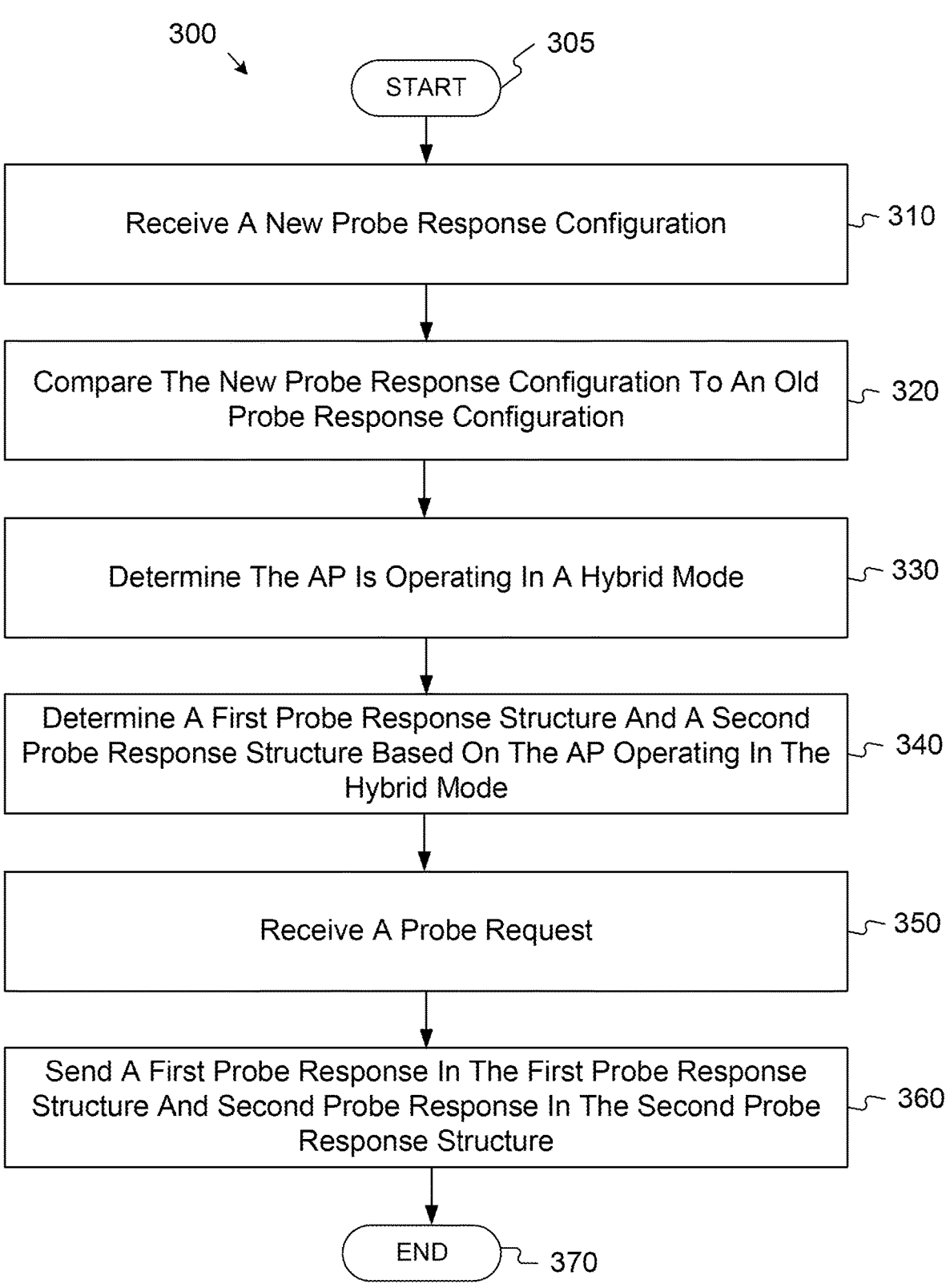
FIG. 3 is a flow chart of a method for providing adaptive probe responses with an AP in a hybrid mode.

FIG. 3 is a flow chart of a method 300 for providing adaptive probe responses with an AP in a hybrid mode. The method 300 may begin at starting block 305 and proceed to operation 310. In operation 310, a new probe response configuration may be received. For example, the AP 104 may receive a new probe response configuration in response to new options being available (e.g., changes to standards or certifications).

In operation 320, the new probe response configuration may be compared to an old probe response configuration. The comparison may include determining one or more IE changes. For example, the AP 104 may compare the new IE and the old IE to determine changes (e.g., changes to bits, additions to fields, deletions from fields, etc.). The AP 104 may compare the new probe response configuration to the old probe response configuration to determine the new options included in the new probe response configuration.

In operation 330, it may be determined that the AP is operating in a hybrid mode. For example, the AP 104 determines the AP 104 is or should be operating in hybrid mode based on the comparison of the new probe response configuration to the old probe response configuration. For example, the AP 104 may determine to operate in the hybrid mode because one or more of the new options is an inclusive change.

In operation 340, a first probe response structure may be determined based on the old response configuration and second probe response structure may be determined based on the old probe response configuration with the IE changes of the new probe response configuration. For example, based on determining the AP 104 is operating in the hybrid mode, the AP 104 may determine the first probe response structure and the second probe response structure. The first probe response structure may include the old options (e.g., the probe response structure of a previously configured WLAN). The second response structure may include the old options and the new options.

In operation 350, a probe request from a STA may be received. For example, the AP 104 receives the probe request from the STA 102. In operation 260, a first probe response in the first probe response structure and a second probe response in the second probe response structure may be sent. For example, the AP 104 may send the first probe response and the second probe response to the STA 102. The method 300 may conclude at ending block 370.

FIG. 4 is a flow chart of a method 400 for providing adaptive probe responses with an AP in a duplicate mode. The method 400 may being at starting block 405 and proceed to operation 410. In operation 410, a new probe response configuration may be received. For example, the AP 104 may receive a new probe response configuration in response to new options being available (e.g., changes to standards or certifications).

In operation 420, the new probe response configuration may be compared to an old probe response configuration. The comparison may include determining one or more IE changes. For example, the AP 104 may compare the new IE and the old IE to determine changes (e.g., changes to bits, additions to fields, deletions from fields, etc.). The AP 104 may compare the new probe response configuration to the old probe response configuration to determine the new options included in the new probe response configuration.

In operation 430, it may be determined the AP is operating in a duplicate mode. For example, the AP 104 determines the AP 104 is or should be operating in the duplicate mode based on the comparison of the new probe response configuration to the old probe response configuration. For example, the AP 104 may determine to operate in the duplicate mode because one or more of the new options is an exclusive change.

In operation 440, a first probe response structure may be determined based on the old response configuration and second probe response structure may be determined based on the new probe response configuration. For example, based on determining the AP 104 is operating in the duplicate mode, the AP 104 may determine the first probe response structure and the second probe response structure. The first probe response structure may include the old options (e.g., the probe response structure of a previously configured WLAN). The second response structure may include the new options.

In operation 450, a probe request from a STA may be received. For example, the AP 104 receives the probe request from the STA 102. In operation 460, a first probe response in the first probe response structure and a second probe response in the second probe response structure may be sent. For example, the AP 104 may send the first probe response and the second probe response to the STA 102. The method 400 may conclude at ending block 470.

Figure 5:
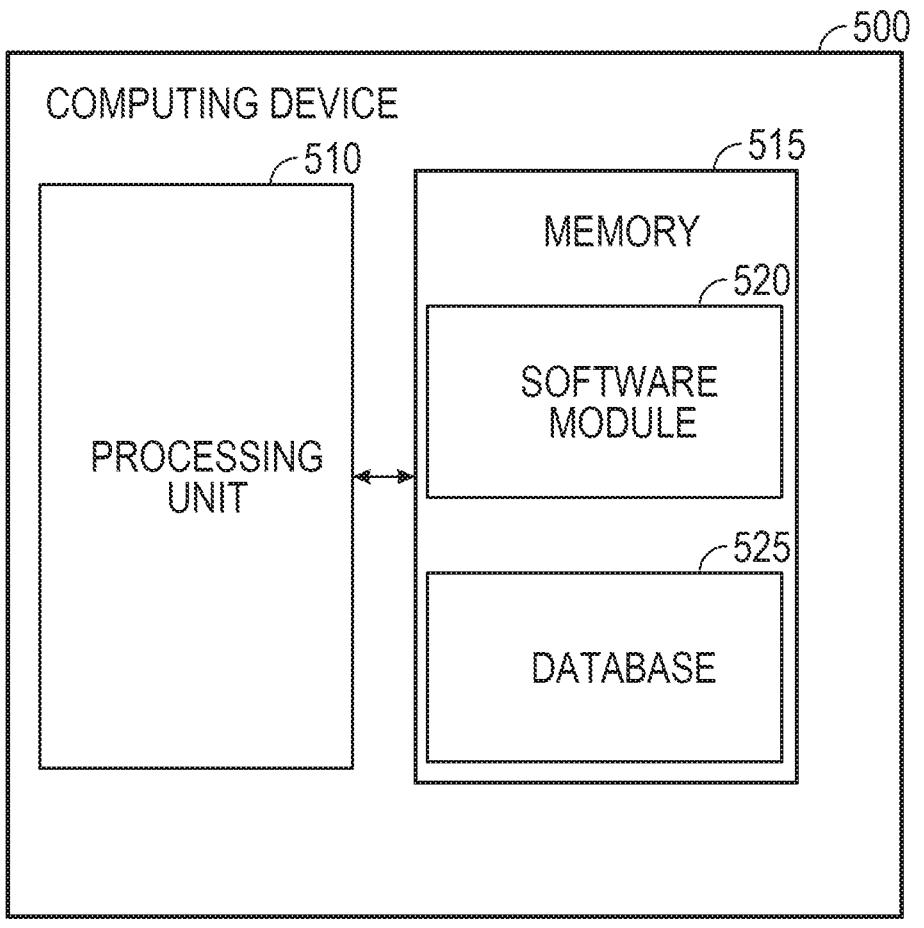
FIG. 5 is a block diagram of a computing device.

FIG. 5 is a block diagram of a computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing adaptive probe responses with respect to FIG. 1, FIG. 2, FIG. 3, and FIG. 4. Computing device 500, for example, may provide an operating environment for the STA 102, the AP 104, the network core 106 and/or any other system described herein. The STA 102, the AP 104, the network core 106 and/or any other system described herein may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
receiving, by an Access Point (AP), a new probe response configuration;
comparing, by the AP, the new probe response configuration to an old probe response configuration, wherein the comparing includes determining one or more Information Element (IE) changes;
determining, by the AP, that the AP is operating in an ignore mode based on the comparison of the new probe response configuration to the old probe response configuration;

determining, by the AP, a probe response structure using the new probe response configuration based on determining that the AP is operating in the ignore mode;
receiving, by the AP, a probe request from a Station (STA);
sending, by the AP, a probe response in the probe response structure based on determining the AP is operating in the ignore mode;
receiving, by the AP, an association failure report; and
changing, by the AP, operation to one of a hybrid mode or a duplicate mode based on the association failure report passing a threshold or a frequency.

2. The method of claim 1, further comprising monitoring a scans-to-successful associations ratio of a Wireless Local Area Network (WLAN) using the probe response structure.

3. The method of claim 2, further comprising determining a change in the scans-to-successful associations ratio based on the monitoring.

4. The method of claim 3, further comprising:
changing, by the AP, operation to a hybrid mode based on the change in the scans-to-successful associations ratio;
based on the AP operating in the hybrid mode, determining, by the AP, a second probe response structure based on the old probe response configuration and a third probe response structure based on the old probe response configuration with the IE changes of the new probe response configuration;
receiving, by the AP, a second probe request from the STA; and
sending, by the AP, a second probe response in the second probe response structure and a third probe response in the third probe response structure.

5. The method of claim 1, further comprising making changes to the probe response structure.

6. The method of claim 1, further comprising iteratively adding a new option to the probe response structure while monitoring the association failure report.

7. The method of claim 6, further comprising determining from the association failure report that the new option caused association failure.

8. The method of claim 1, wherein comparing the new probe response configuration to the old probe response configuration comprises determining new options included in the new probe response configuration.

9. A system comprising:
a memory storage; and
a processing unit disposed in an Access Point (AP) and coupled to the memory storage, wherein the processing unit is operative to:
receive a new probe response configuration;
compare the new probe response configuration to an old probe response configuration, wherein the comparing includes determining one or more Information Element (IE) changes;
determine that an Access Point (AP) is operating in an ignore mode based on the comparison of the new probe response configuration to the old probe response configuration;
determine a probe response structure using the new probe response configuration based on determining that the AP is operating in the ignore mode;
receive a probe request from a Station (STA);
send a probe response in the probe response structure based on determining the AP is operating in the ignore mode;
receive an association failure report; and change operation to one of a hybrid mode or a duplicate mode based on the association failure report passing a frequency or a threshold.

10. The system of claim 9, wherein the processing unit is further operative to monitor a scans-to-successful associations ratio of a Wireless Local Area Network (WLAN) using the probe response structure.

11. The system of claim 10, wherein the processing unit is further operative to determine a change in the scans-to-successful associations ratio based on the monitoring.

12. The system of claim 11, wherein the processing unit is further operative to:

change operation to the hybrid mode based on the change in the scans-to-successful associations ratio;

determine, based on the AP operating in the hybrid mode, a second probe response structure based on the old probe response configuration and a third probe response structure based on the old probe response configuration with the IE changes of the new probe response configuration;

receive a second probe request from the STA; and send a second probe response in the second probe response structure and a third probe response in the third probe response structure.

13. The system of claim 9, wherein the processing unit is further operative to make changes to the probe response structure.

14. The system of claim 9, wherein the processing unit is further operative to iteratively add a new option to the probe response structure while monitoring the association failure report.

15. The system of claim 14, wherein the processing unit is further operative to determine from the association failure report that the new option caused association failure.

16. The system of claim 9, wherein the processing unit being operative to compare the new probe response configuration to the old probe response configuration comprises wherein the processing unit being operative to determining new options included in the new probe response configuration.

17. A non-transitory computer-readable medium that stores a set of instructions which when executed perform a method executed by the set of instructions comprising:

receiving, by an Access Point (AP), a new probe response configuration;

comparing, by the AP, the new probe response configuration to an old probe response configuration, wherein the comparing includes determining one or more Information Element (IE) changes;

determining, by the AP, that the AP is operating in an ignore mode based on the comparison of the new probe response configuration to the old probe response configuration;

determining, by the AP, a probe response structure using the new probe response configuration based on determining that the AP is operating in the ignore mode;

receiving, by the AP, a probe request from a Station (STA);

sending, by the AP, a probe response in the probe response structure based on determining the AP is operating in the ignore mode;

monitoring a scans-to-successful associations ratio of a Wireless Local Area Network (WLAN) using the probe response structure;

determining a change in the scans-to-successful associations ratio based on the monitoring; and changing, by the AP, operation to a hybrid mode based on the change in the scans-to- successful associations ratio.

18. A non-transitory computer-readable medium of claim 17, further comprising:

based on the AP operating in the hybrid mode, determining, by the AP, a second probe response structure based on the old probe response configuration and a third probe response structure based on the old probe response configuration with the IE changes of the new probe response configuration;

receiving, by the AP, a second probe request from the STA; and sending, by the AP, a second probe response in the second probe response structure and a third probe response in the third probe response structure.

19. The non-transitory computer-readable medium of claim 17, further comprising:

receiving, by the AP, an association failure report; and changing, by the AP, operation to one of a hybrid mode or a duplicate mode based on the association failure report passing a frequency or a threshold.

20. The non-transitory computer-readable medium of claim 17, further comprising making changes to the probe response structure by iteratively adding a new option to the probe response structure while monitoring the association failure report.

* * * * *